United States Patent
Hum et al.

(10) Patent No.: US 7,203,825 B2
(45) Date of Patent: Apr. 10, 2007

(54) SHARING INFORMATION TO REDUCE REDUNDANCY IN HYBRID BRANCH PREDICTION

(75) Inventors: Herbert H. J. Hum, Portland, OR (US); Stephan J. Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 09/970,485

(22) Filed: Oct. 3, 2001

(65) Prior Publication Data

US 2003/0065912 A1 Apr. 3, 2003

(51) Int. Cl.
*G06F 9/32* (2006.01)
(52) U.S. Cl. ...................................... 712/239
(58) Field of Classification Search ................ 712/233, 712/234, 238, 239, 240
See application file for complete search history.

(56) References Cited

U.S. PATENT DOCUMENTS

| | | | | |
|---|---|---|---|---|
| 5,163,140 A | * | 11/1992 | Stiles et al. | 711/140 |
| 5,604,877 A | * | 2/1997 | Hoyt et al. | 712/243 |
| 5,608,886 A | * | 3/1997 | Blomgren et al. | 712/239 |
| 6,021,489 A | * | 2/2000 | Poplingher | 712/239 |
| 6,092,187 A | * | 7/2000 | Killian | 712/239 |

OTHER PUBLICATIONS

McFarling, "Combining Branch Predictors," WRL Technical Note TN-36, Jun. 1993, pp. 1-25.*

* cited by examiner

*Primary Examiner*—Eddie Chan
*Assistant Examiner*—David J. Huisman
(74) *Attorney, Agent, or Firm*—Blakely, Sokoloff, Taylor & Zafman LLP

(57) ABSTRACT

A hybrid branch predictor is disclosed. The predictor includes prediction aiding information, a plurality of branch predictors to provide a plurality of branch predictions, a plurality of storage elements to hold less than full extent of the branch predictions, but sharing information among said plurality of storage elements enables extraction of said full extent of the prediction. The predictor also includes a selection mechanism to select a prediction from the plurality of branch predictions.

20 Claims, 3 Drawing Sheets

SHARING INFORMATION TO REDUCE REDUNDANCY IN HYBRID BRANCH PREDICTION

BACKGROUND

The present invention relates to computer architecture. More particularly, the invention relates to branch prediction.

Computer processors often employ pipelining to increase performance. "Pipelining" refers to a processing technique in which multiple sequential instructions are executed in an overlapping manner. Thus, when program flow is substantially sequential, a pipelined architecture may achieve significant performance advantages over non-pipelined architecture. In actual programs, however, a significant percentage of program instructions are branches. Branch instructions cause a program to deviate from a sequential flow. Therefore, the instruction to be executed (i.e. the target of the branch) may not be the next instruction in the fetch sequence.

One approach to solving this problem, called branch prediction, involves making accurate, educated determinations about whether an instruction will result in a branch to another location. Branch prediction is premised on the assumption that, under similar circumstances, the outcome of a conditional branch will likely be the same as prior outcomes. However, all speculative tasks beyond a branch must be thrown away if that branch is mispredicted. Therefore an accurate branch prediction technique is important to deeply pipelined processors.

Hybrid branch predictors have been introduced as a way to achieve higher prediction accuracies. The hybrid branch predictor combines multiple prediction schemes into a single predictor. A selection mechanism is used to decide for each branch, which single-scheme predictor to use. An effective hybrid branch predictor may exploit the different strengths of its single-scheme predictor components, enabling it to achieve a prediction accuracy greater than that which could be achieved by any of its components alone. Since the selection mechanism of the hybrid branch predictor selects prediction of only one predictor at a particular branch, information generated by other predictors at the same branch may be redundant. Accordingly, the existing hybrid branch prediction scheme may promote inefficient utilization of memory space in the storage arrays of the branch prediction.

DETAILED DESCRIPTION

In recognition of the above-described inefficient utilization of storage arrays in existing hybrid branch prediction schemes, the present invention describes embodiments for removing redundant information and leveraging prediction information from components/predictors of a hybrid branch predictor. This leveraging of redundant information enables configuration of smaller storage arrays (i.e. smaller memory size) and simpler routing of wires. Consequently, for purposes of illustration and not for purposes of limitation, the exemplary embodiments of the invention are described in a manner consistent with such use, though clearly the invention is not so limited.

Figure 1:
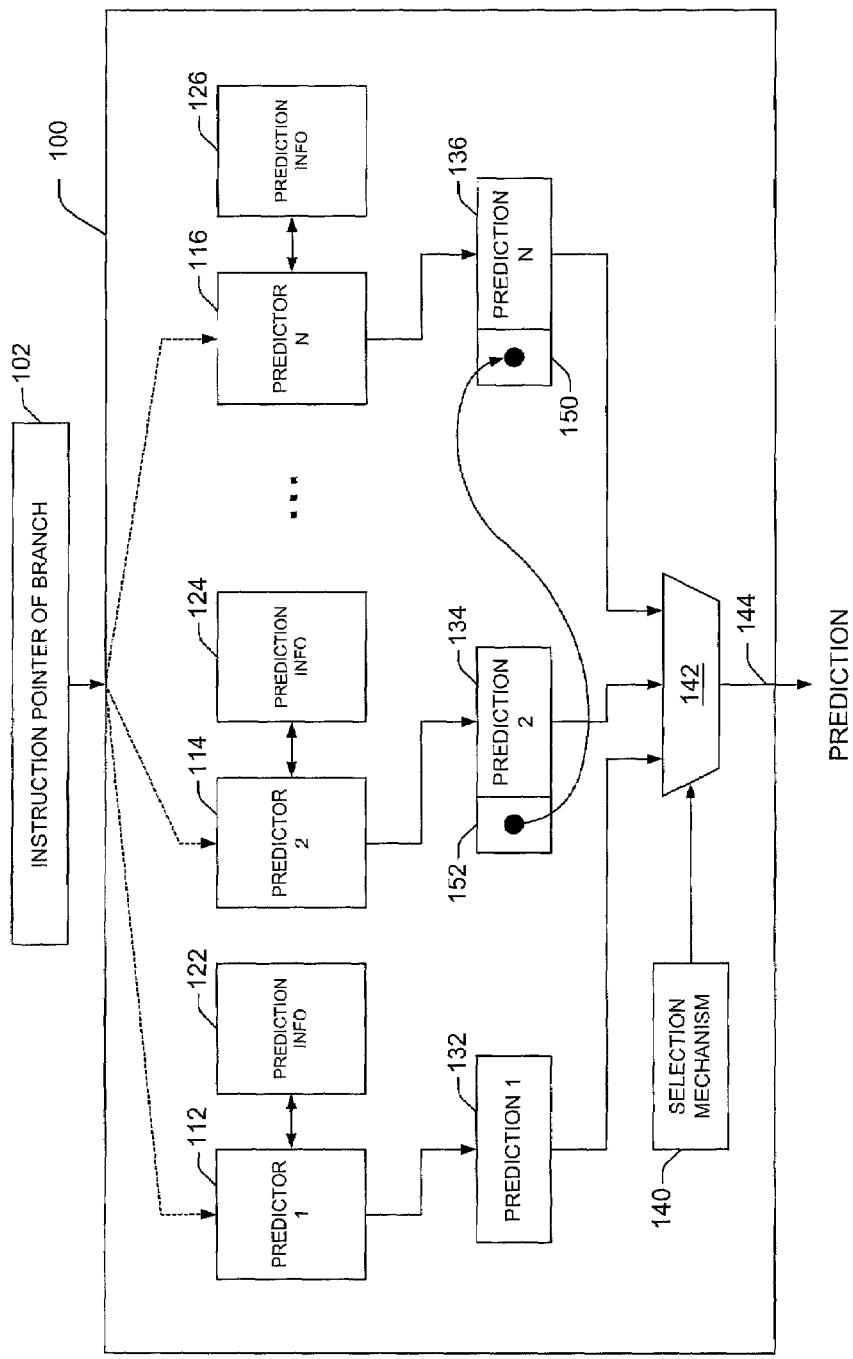
FIG. 1 is a block diagram of a hybrid branch predictor according to an embodiment of the present invention.

A block diagram of a hybrid branch predictor 100 according to an embodiment of the present invention is shown in FIG. 1. When a branch is encountered in a program, an instruction pointer 102 directs a set of single-scheme predictors 1 through N (112, 114, 116) to provide predictions 1 through N (132, 134, 136) on the branch. The predictors 112, 114, 116 may utilize a set of prediction aiding information 122, 124, 126. In one embodiment, the prediction aiding information 122, 124, 126 may include prior outcome information. In other embodiments, the prediction aiding information 122, 124, 126 may include a type of branch, a correlation factor, a confidence level, and other related parameters. Thus, each of the single-scheme predictors 112, 114, 116 makes a prediction 132, 134, 136 at each branch based on the corresponding prediction aiding information 122, 124, 126. A selection mechanism 140 then directs a selector 142 to select one of the predictions 132, 134, 136 to be the hybrid predictor's prediction 144.

In one embodiment, the selection mechanism is implemented as an array of 2-bit counters. Each branch may be associated with a counter which keeps track of which predictor was currently more accurate for that branch. This array may be referred to as the branch predictor selection table. Upon confirmation of a branch prediction, the counter is incremented or decremented depending on which single-scheme predictor was correct. If both were correct (or incorrect), the counter state would be left unchanged. Thus, in this embodiment, if the most significant bit is set, the first prediction is selected. Otherwise, the second prediction is selected.

In the hybrid branch predictor 100, each single-scheme predictor 112, 114, 116 may be classified as a static or a dynamic branch predictor. The static branch predictor uses information gathered before program execution, such as branch op-codes or profiles, to predict branch direction. An example of the static branch predictor includes a predictor which only predicts that conditional branches are either taken or not-taken. The dynamic branch predictor uses information gathered at run-time to predict branch direction. Examples of dynamic branch predictor include a local predictor, a global predictor, a bimodal predictor, and other related predictors.

A bimodal branch prediction scheme uses a table of 2-bit saturating up-down counters to keep track of the direction a branch is more likely to take. Each branch is mapped via its address to a counter. The branch is predicted taken if the most significant bit of the associated counter is set. Otherwise, it is predicted as not-taken. These counters are updated based on the branch outcomes. When a branch is taken, the 2-bit value of the associated counter is incremented by one. Otherwise, the value is decremented by one.

By keeping more history information, a higher level of branch prediction accuracy may be attained. For example, a certain type of global predictor referred to as a two-level predictor may use two levels of history to make branch predictions. The first level history records the outcomes of the most recently executed branches and the second level history keeps track of the more likely direction of a branch when a particular pattern is encountered in the first level history.

Certain types of branches may require more processing and/or memory. For example, indirect branches, which transfer control to an address stored in a register, are hard to predict accurately. Unlike standard conditional branches, the indirect branches may have more than two targets. Hence, the prediction may require a full 32-bit or 64-bit address rather than just a "taken" or "not taken" bit. Furthermore, the behavior of the indirect branches is often directly determined by data loaded from memory, such as virtual function pointers in object-oriented programs written in languages such as C++ and Java. These languages promote a programming style in which late binding of subroutine invocations is the main instrument for clean, modular code design. Current processors may predict indirect branches with a branch target buffer (BTB) which caches the most recent target address of a branch. Unfortunately, the branch target buffers typically have much lower prediction rates than the best predictors for conditional branches.

In indirect branch predictors, target addresses may be stored as entire instruction addresses of the target. For example, if the address space is 32 bits, the target addresses in the indirect branch predictor may be 32-bit entities. However, as shown in the illustrated embodiment of FIG. 1, target addresses stored in the indirect target array or any other target array of the hybrid branch predictor may be configured with less than the full size of the instruction address. Hence, only a subset of the target address may be stored.

In the illustrated embodiment of FIG. 1, predictor N (116) may be an indirect branch predictor. Therefore, prediction N (136) for the indirect branch predictor 116 includes the target address for the indirect branch. If the selection mechanism 140 directs the selector 142 to select prediction N (136) of the indirect branch predictor 116, the information in predictions 1 and 2 (132, 134), as well as predictions 3 through N-1 (not shown), may become redundant and may get discarded. However, some of the target address bits from the indirect branch predictor 116 may be derived from one of the other predictors. Accordingly, the target address in prediction N (136) may be configured to utilize less than the full size of the instruction address.

In the illustrated embodiment, the most significant bits 150 of the target address (in prediction N) are taken from the most significant bits 152 of the target address in prediction 2 (134). Hence, if the address space for prediction requires y bits for addressing, then only x least significant bits of the target address may be stored in the predictor array, where x<y. In one embodiment, the (y–x) most significant bits of the target address may be assumed to be the (y–x) most significant bits of the target address stored in another predictor. In an alternative embodiment, the (y–x) most significant bits may be assumed to be the indirect branch's instruction address. Therefore, prediction N (136) uses prediction information from other predictors, such as predictor 2 (114), which would normally be discarded once the prediction is selected.

In other embodiments, redundant information removal process may involve the use of redundant information in a cascaded branch predictor, which is a special form of a hybrid predictor. A global history component of the cascaded branch predictor uses a strength bit of the bimodal branch predictor component to influence its prediction. However, the redundant information removal process of these embodiments enables the leveraging of information from other predictor components so that the global history component does not need to store the strength bit of the bimodal component. Instead, that information and manipulation of that information may remain the sole domain of the bimodal component.

Figure 2:
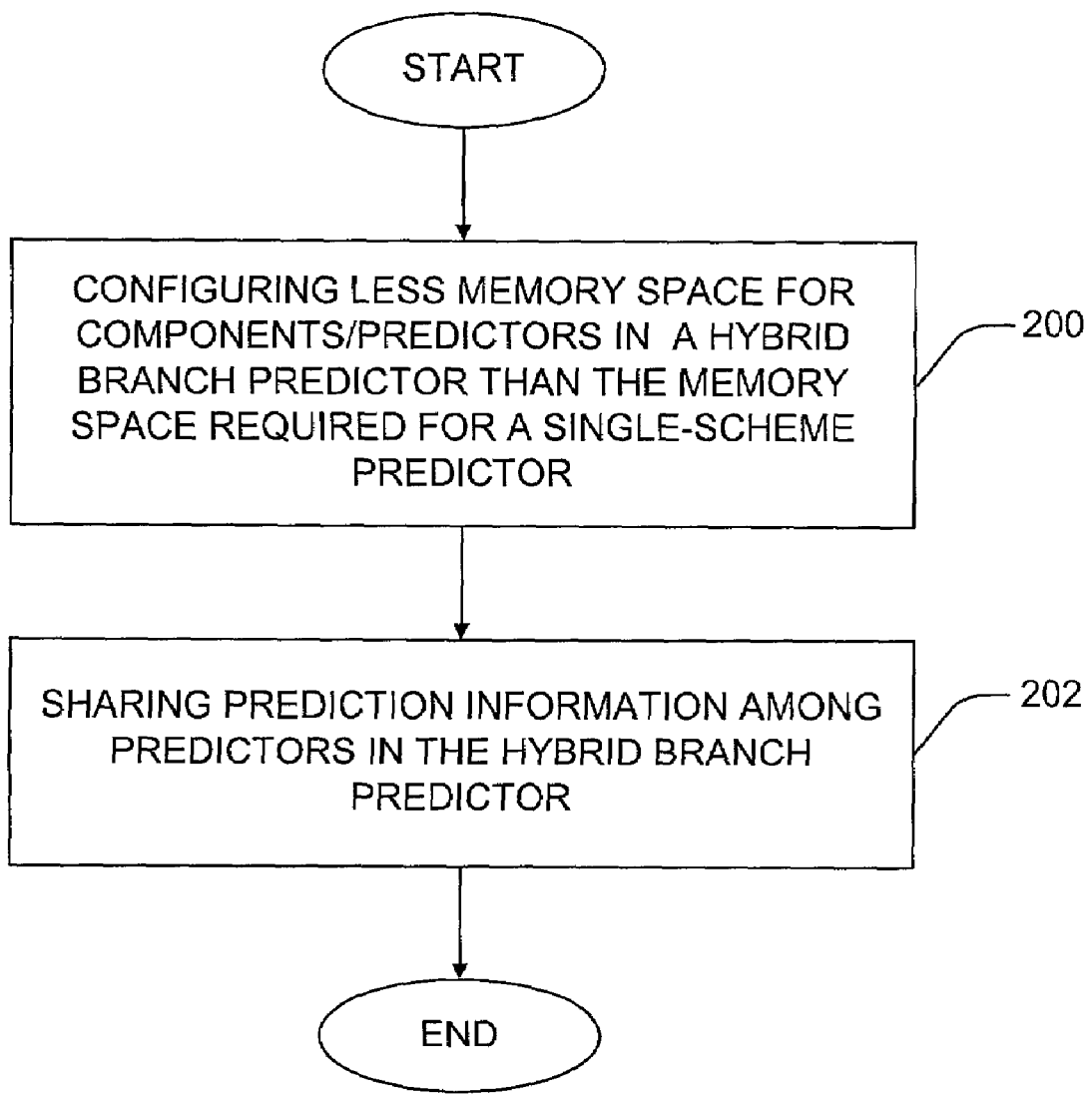
FIG. 2 is a process for removal and leveraging of prediction information in a hybrid branch predictor according to an embodiment of the present invention.

A process for removal and leveraging of prediction information in a hybrid branch predictor is illustrated in FIG. 2 as a flowchart according to an embodiment of the present invention. The process includes configuring less memory space for components and/or predictors in a hybrid branch predictor than the memory space required for a single-scheme predictor, at 200. The prediction is then leveraged among components and/or predictors in the hybrid branch predictor, at 202. The leveraging may include sharing of the prediction information such that the information for a selected predictor in the hybrid branch predictor include substantially similar amount of information as that for the single-scheme predictor. As stated above, sharing of the prediction information may include using target address information from the redundant information in the non-selected predictors.

Figure 3:
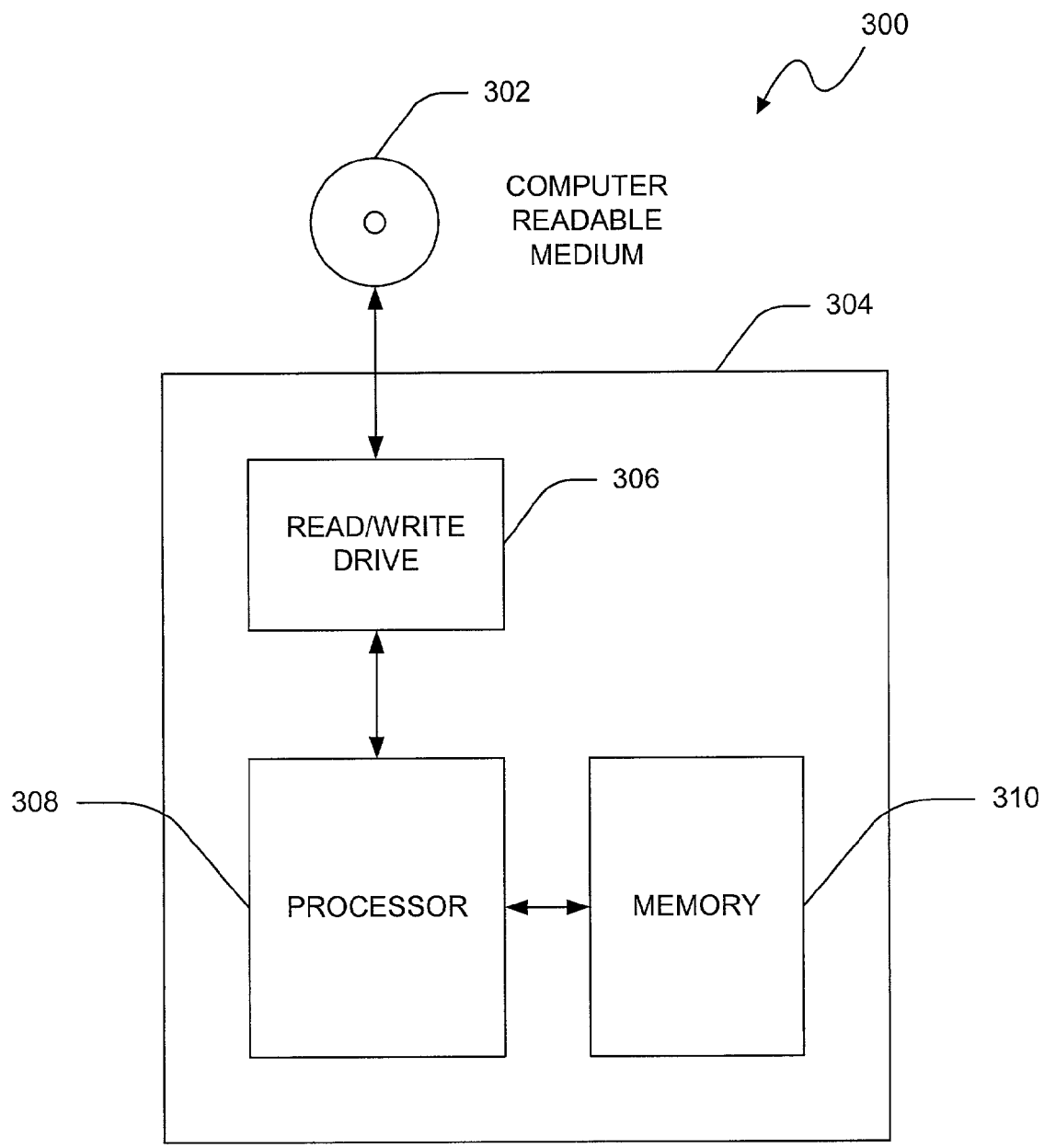
FIG. 3 a block diagram of a processor-based system which may execute codes residing on the computer readable medium.

FIG. 3 is a block diagram of a processor-based system 300 which may execute codes residing on the computer readable medium 302. The codes are related to configuring of memory space and leveraging of prediction information described in FIGS. 1 and 2. In one embodiment, the computer readable medium 302 may be a fixed medium such as read-only memory (ROM) or a hard disk. In another embodiment, the medium 302 may be a removable medium such as a floppy disk or a compact disk (CD). A read/write drive 306 in the computer 304 reads the code on the computer readable medium 302. The code is then executed in the processor 308. The processor 308 may access the computer main memory 310 to store or retrieve data.

There has been disclosed herein embodiments for removing redundant information and leveraging prediction information from components/predictors of a hybrid branch predictor. Thus, the present embodiments enable configuration of less memory space for components and/or predictors in a hybrid branch predictor than the memory space required for a single-scheme predictor. The prediction information is then leveraged among components and/or predictors in the hybrid branch predictor. The leveraging of the prediction information allows the selected predictor to use substantially similar amount of information as that for the single-scheme predictor.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the present invention. It will be apparent, however, to one skilled in the art that the system and method may be practiced without some of these specific details. For example, the redundant information may be leveraged from components other than the predictors in the hybrid branch predictor, such as a global history component. In other instances, well-known structures and functions were not described in elaborate detail in order to avoid obscuring the subject matter of the present invention. Accordingly, the scope and spirit of the invention should be judged in terms of the claims which follow.

What is claimed is:

1. A branch predictor system, comprising:
    a plurality of a first kind of storage elements to store prediction aiding information, the prediction aiding information including outcome information of prior branch predictions;
    a plurality of branch predictors to provide a plurality of branch predictions, each of the branch predictors corresponding to each of the first kind of storage elements to store prior prediction outcomes of each of the branch predictors, and each predictor to make a corresponding prediction based on at least a portion of a branch instruction pointer and contents of a corresponding one of said plurality of said first kind of storage elements;

a plurality of a second kind of storage elements each corresponding to the plurality of branch predictors, each of the branch predictors to make a determination on the corresponding prediction for a branch location of an instruction, each one of said second kind of storage elements to hold less than full extent of said corresponding prediction, but sharing information among said plurality of said second kind of storage elements to enable extraction of said full extent of said corresponding prediction, wherein a first one of said second kind of storage elements, corresponding to an indirect branch predictor of said plurality of branch predictors, is to store a portion of a target address, and a second one of said second kind of storage elements, corresponding to another predictor of said plurality of branch predictors, is to supply a remainder of said target address; and a selection mechanism to select a prediction from said plurality of said second kind of storage elements based on prediction scores of the plurality of branch predictors collected based on prior predictions performed by the branch predictors, wherein for each branch instruction, the plurality of branch predictors are configured to perform branch predictions substantially concurrently, and wherein the selection mechanism is configured to select a branch prediction from one of the plurality of branch predictors having the highest prediction score.

2. The system of claim 1, wherein said corresponding prediction includes at least one target address.

3. The system of claim 2, wherein said corresponding prediction also includes a "taken"/"not taken" bit.

4. The system of claim 1, wherein said full extent of said corresponding prediction includes a 32-bit address.

5. The system of claim 4, wherein said each one of said second kind of storage elements is configured to be less than or equal to 32 bits.

6. The system of claim 1, wherein said prediction aiding information includes prior outcome information.

7. The system of claim 1, wherein said prediction aiding information includes a type of branch.

8. The system of claim 1, wherein said prediction aiding information includes a correlation factor.

9. The system of claim 1, wherein said prediction aiding information includes a confidence level.

10. The system of claim 1, wherein said selection mechanism includes a counter to determine which predictor is currently more accurate.

11. The system of claim 1, wherein a predetermined number of most significant bits in said corresponding prediction is shared.

12. A computer-implemented method, comprising:

storing in a plurality of a first kind of storage elements prediction aiding information, the prediction aiding information including outcome information of prior branch predictions;

performing a plurality of branch predictions using a plurality of branch predictors, each of the branch predictors corresponding to each of the first kind of storage elements to store prior prediction outcomes of each of the branch predictors, each predictor to make a corresponding prediction based on at least a portion of a branch instruction pointer and contents of a corresponding one of the plurality of the first kind of storage elements;

storing in a plurality of a second kind of storage elements each corresponding to the plurality of branch predictors, each of the branch predictors making a determination on the corresponding prediction for a branch location of an instruction, each to hold less than full extent of the corresponding prediction, but sharing information among the plurality of the second kind of storage elements to enable extraction of the full extent of the corresponding prediction, wherein a first one of the second kind of storage elements, corresponding to an indirect branch predictor of the plurality of branch predictors, is to store a portion of a target address, and a second one of the second kind of storage elements, corresponding to another predictor of the plurality of branch predictors, is to supply a remainder of the target address; and selecting a prediction from the plurality of the second kind of storage elements based on prediction scores of the plurality of branch predictors collected based on prior predictions performed by the branch predictors, wherein for each branch instruction, the plurality of branch predictors are configured to perform branch predictions substantially concurrently, and wherein the selection mechanism is configured to select a branch prediction from one of the plurality of branch predictors having the highest prediction score.

13. The method of claim 12, wherein said corresponding prediction includes at least one target address.

14. The method of claim 13, wherein said corresponding prediction also includes a "taken"/"not taken" bit.

15. The method of claim 12, wherein said full extent of said corresponding prediction includes a 32-bit address.

16. The method of claim 15, wherein said each one of said second kind of storage elements is configured to be less than or equal to 32 bits.

17. The method of claim 12, wherein said prediction aiding information includes at least one of prior outcome information, a type of branch, a correlation factor, a confidence level.

18. The method of claim 12, wherein said selection mechanism includes a counter to determine which predictor is currently more accurate.

19. The method of claim 12, wherein a predetermined number of most significant bits in said corresponding prediction is shared.

20. A machine-readable medium having instructions which, when executed by a machine, cause the machine to perform a method, the method comprising:

storing in a plurality of a first kind of storage elements prediction aiding information, the prediction aiding information including outcome information of prior branch predictions;

performing a plurality of branch predictions using a plurality of branch predictors, each of the branch predictors corresponding to each of the first kind of storage elements to store prior prediction outcomes of each of the branch predictors, and each predictor to make a corresponding prediction based on at least a portion of a branch instruction pointer and contents of a corresponding one of the plurality of the first kind of storage elements;

storing in a plurality of a second kind of storage elements each corresponding to the plurality of branch predictors, each of the branch predictors making a determination on the corresponding prediction for a branch location of an instruction, each to hold less than full extent of the corresponding prediction, but sharing information among the plurality of the second kind of storage elements to enable extraction of the full extent of the corresponding prediction, wherein a first one of the second kind of storage elements, corresponding to an indirect branch predictor of the plurality of branch predictors, is to store a portion of a target address, and a second one of the second kind of storage elements, corresponding to another predictor of the plurality of branch predictors, is to supply a remainder of the target address; and selecting a prediction from the plurality of the second kind of storage elements based on prediction scores of the plurality of branch predictors collected based on prior predictions performed by the branch predictors, wherein for each branch instruction, the plurality of branch predictors are configured to perform branch predictions substantially concurrently, and wherein the selection mechanism is configured to select a branch prediction from one of the plurality of branch predictors having the highest prediction score.

* * * * *